(12) United States Patent  (10) Patent No.: US 8,459,194 B2
Stein et al.  (45) Date of Patent: Jun. 11, 2013

(54) SAIL MEMBRANE

(75) Inventors: Uwe Stein, Heinsberg (DE); Heiner Schillings, Heinsberg (DE)

(73) Assignee: Dimension-Polyant GmbH (DE)

( * ) Notice: Subject to any disclaimer, the term of this patent is extended or adjusted under 35 U.S.C. 154(b) by 0 days.

(21) Appl. No.: 12/490,937

(22) Filed: Jun. 24, 2009

(65) Prior Publication Data

US 2009/0320733 A1 Dec. 31, 2009

(30) Foreign Application Priority Data

Jun. 26, 2008 (DE) .......................... 10 2008 030 447

(51) Int. Cl.
*B63H 9/04* (2006.01)

(52) U.S. Cl.
USPC ..................................... 114/102.31; 156/209

(58) Field of Classification Search
USPC ......... 114/102.29, 102.31; 210/651; 156/196, 156/199, 209, 229; 264/283, 284; 428/198
See application file for complete search history.

(56) References Cited

U.S. PATENT DOCUMENTS

| 4,499,842 | A | * | 2/1985 | Mahr ........................ 114/102.31 |
| 4,756,835 | A | * | 7/1988 | Wilson .......................... 210/651 |
| 5,304,414 | A | * | 4/1994 | Bainbridge et al. ...... 114/102.31 |
| 5,333,568 | A | * | 8/1994 | Meldner et al. .......... 114/102.31 |
| 6,878,433 | B2 | * | 4/2005 | Curro et al. ................... 428/198 |
| 2010/0000456 | A1 | * | 1/2010 | Stein et al. ............... 114/102.29 |

* cited by examiner

*Primary Examiner* — Lars A Olson

(74) *Attorney, Agent, or Firm* — St. Onge Steward Johnston & Reens LLC

(57) ABSTRACT

Sail membrane preferably made of a woven fabric of synthetic fibers, with said membrane having a microroughness in the form of parallelly extending grooves arranged so as to achieve a density of 5 to 25 grooves/mm deposited on or integrated into said membrane surface.

10 Claims, 3 Drawing Sheets

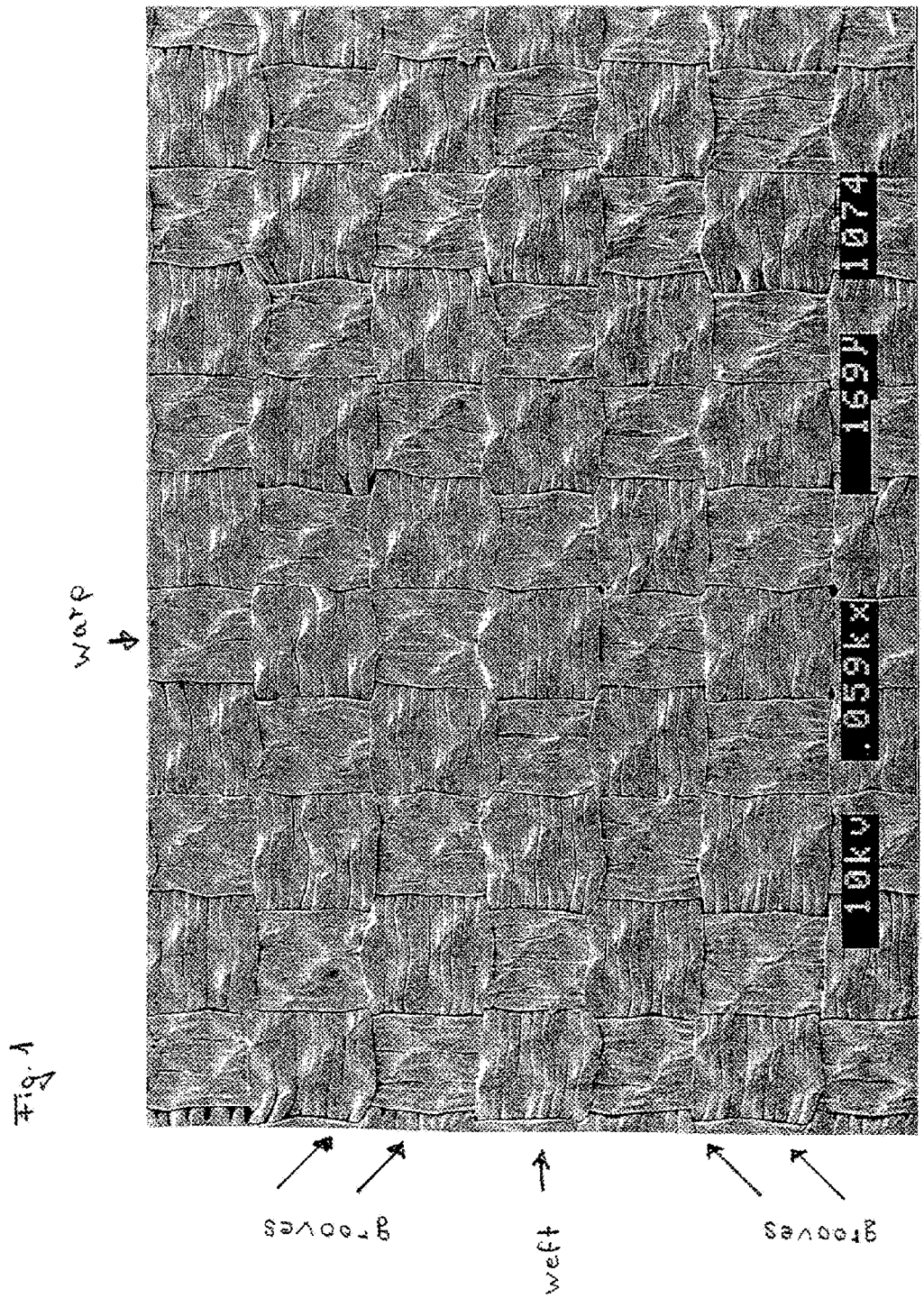

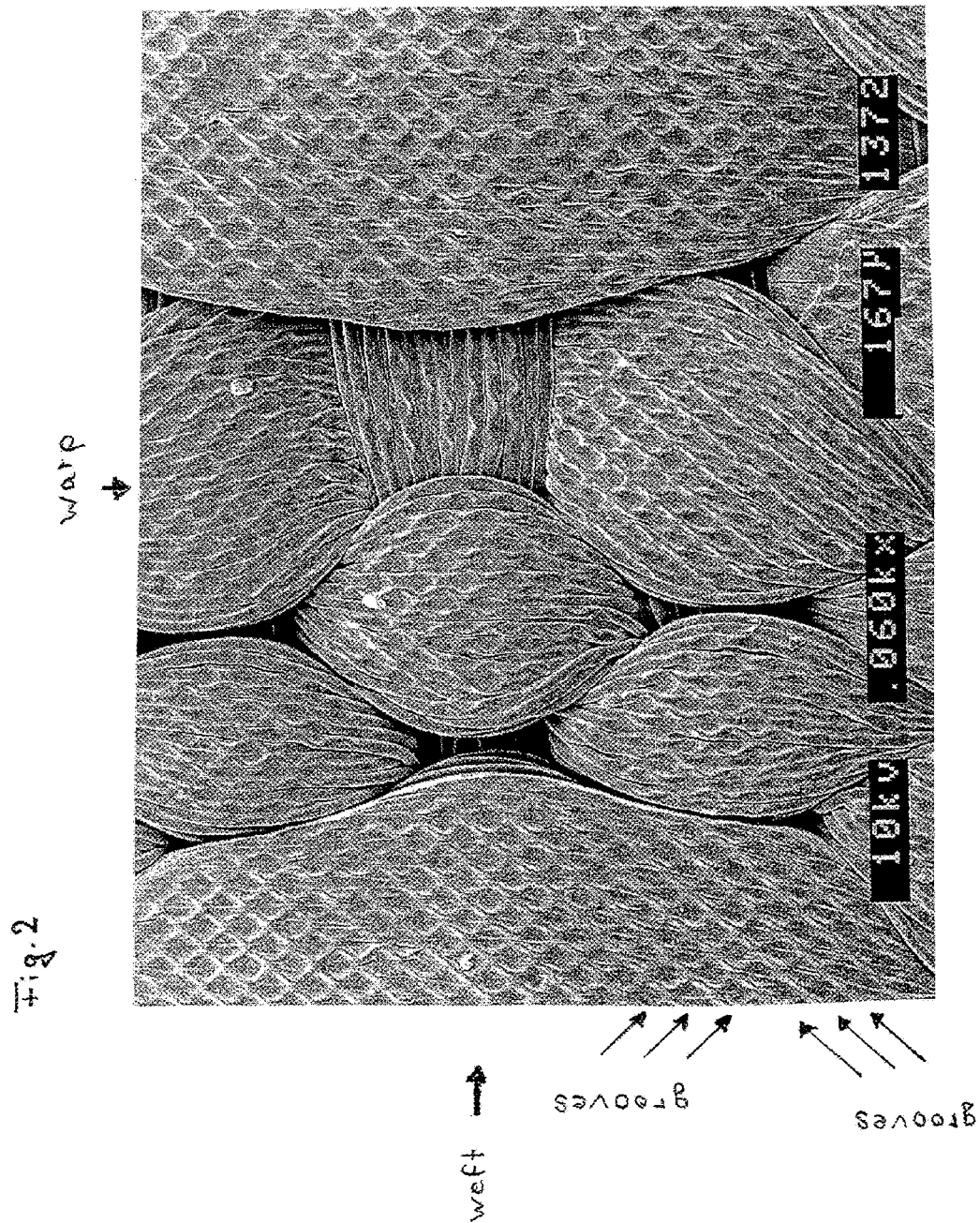

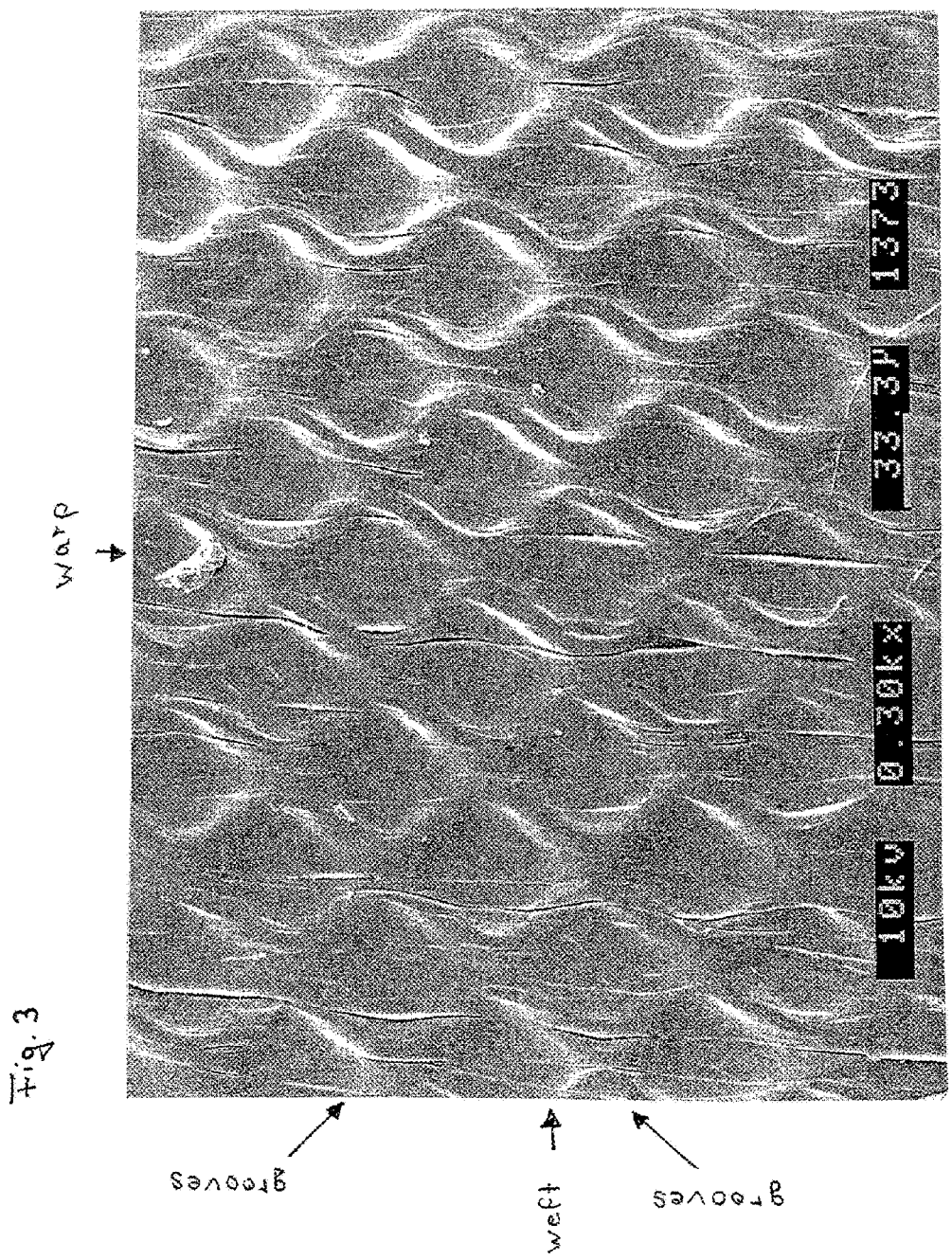

SAIL MEMBRANE

CROSS-REFERENCE TO RELATED APPLICATIONS

The present application claims priority of German patent application No. 10 2008 030 447.6 filed on Jun. 26, 2008.

FIELD OF THE INVENTION

The invention relates to a sail membrane, a method for manufacturing such a sail membrane and sails manufactured from said sail membrane.

BACKGROUND OF THE INVENTION

When manufacturing sails, also for competition purposes, it is an essential requirement to combine quite a number of special characteristics such as low weight, good handling qualities, low permeability to wind, high tearing resistance, elasticity, low water absorptiveness, UV resistance and similar properties. Therefore, the ultimate goal sailmakers have in mind is to create an optimized membrane for sail manufacturing which purposefully features all these characteristics.

In sail manufacturing processes it has not yet been attempted hitherto to integrate in a well-aimed manner structures into the membrane surface that improve the air resistance and aerodynamic qualities of the material. If sail membranes are made from sheets they essentially have a smooth surface. If these membranes consist of woven fabrics or composites which is frequently the case with high-grade and large-size sails the surface of the sails is characterized by structures that reflect the inherent woven material structures, as the case may be concealed by sheets, modified by coatings or changed by bonding or fusion means. While these fabric structures have an influence on the aerodynamic properties of the sails and, if applicable, their permeability to wind and water absorptiveness, they are not suited, however, to purposefully change the resistance to air.

Resistance-causing air flow or stream separation and micro-eddying will arise on both smooth as well as structured surfaces that are facing the wind. By purposefully creating microroughness on said surfaces the resistance can be reduced. Roughness in this context is particularly microroughness that brings down the degree of turbulence in the turbulence layer in relation to the surface of the sail. Such microroughness has been developed for aircraft construction purposes and is preferably provided in the form of parallel grooves or flutes arranged longitudinally to the approaching air flow direction.

It is thus the objective of the invention to propose a surface structure suited to provide a sail structure with such a microroughness and utilize said microroughness with a view to lessening turbulences.

SUMMARY OF THE INVENTION

This objective is achieved with a sail membrane the surface of which having a microroughness in the form of parallelly extending grooves arranged so as to achieve a density of 5 to 25 grooves/mm deposited on or integrated into said surface.

Within the scope of the invention the term "sail membrane" shall be understood to relate to a planar or flat material suitable for sailmaking that may consist of a sheet, a woven fabric, a compound comprising various materials (composite) and/or fibers with or without reinforcement. More specific, a "sail membrane" shall in particular be a woven fabric or composite material consisting of or being provided with synthetic fibers. Such a fabric may for example consist of various synthetic fibers including reinforcing fibers that may also be bonded or glued together or welded to each other thermally. In addition to the fabric consisting of synthetic fibers a composite material may also have a lamination comprising one or several sheets. Moreover, a sail membrane may also consist of one or several sheets reinforced by suitably inserted reinforcing filaments.

The sail membrane according to the invention consists of a conventional woven fabric of synthetic fibers, with said fibers being of single type or, otherwise, a mixed fabric may be used. Especially suited are polyamide fibers, for example nylon-6, 6, but also polyester fibers or mixed fibers made of polyester and polyethylene as they are used in sails of the HydraNet® type, for example.

As proposed by the invention the groove density ranges between 5 and 25 grooves/mm corresponding to a groove crest spacing of 200 µm to 40 µm, preferably 8 to 20 grooves/mm corresponding to a crest spacing ranging between 125 µm and 50 µm.

The amplitude of the grooves, i.e. the height of the valleys between two crests up to the crest top preferably amounts to 25 to 75% of the crest spacing and in particular 40 to 60%.

Essentially, the grooves all extend parallelly to each other and, to all intents and purposes, may be arranged on the fabric in any conceivable orientation and direction. However, preferred is a diagonal arrangement at an angle of 45° in relation to the warp or weft filaments, +/−15°. Especially preferred is an essentially diagonal arrangement at 45° because such an extension is best suited to cover up the irregularities of the surface, in particular of woven fabrics.

Microroughness in the form of parallelly extending grooves may be integrated into or applied to the fabric structure or sheet surface in any desired manner, for example by printing, weaving in, applying rows of nanoparticles or by rolling-in methods. Especially preferred is the calendering method using a groove roller, with said roller being heated as a rule to a temperature which is lower than the softening temperature of the sheet material or synthetic fiber or the synthetic fiber having the lowest softening point, preferably approx. 10° C. below. In the interest of improving the embossing effect it may prove expedient to treat the fabric with hot steam before it is calendered, for example at a temperature of 110° C.

Calendering takes place at elevated temperature at a pressure of at least 50 N/mm, preferably at a pressure between 100 and 600 N/mm, especially at 200 to 400 N/mm.

Preferably, both sides of the sail membrane are calendered by means of such a groove roller.

Especially preferred for the inventive sail membrane is a diamond pattern consisting of grooves crossing each other, i.e. of two parallel groove sets each, crossing one another especially at an angle of 80° to 120°. In this way, a rectangular or diamond pattern is formed which in the case of a woven fabric is skewed by 45°±/−15° in relation to the normal fabric pattern consisting of warp and weft filaments crossing one another.

The sail membrane in accordance with the invention may be hydrophobized in a manner known per se, with such a hydrophobization especially being brought about using a perfluoropolyalkylene, for example by means of Teflon®. Preferably, the hydrophobization takes place prior to the calendering process. If the fabric is dyed/colored and finished in a special manner such dyeing and finishing processes shall also take place prior to the calendering operation.

A hydrophobization may in particular be brought about by applying hydrophobic particles, for example by the application of nanoparticles causing a hydrophobic wetting regime according to Cassie-Baxter. Such nanoparticle coatings may be of irregular nature and particularly in terms of dimensioning should significantly fall short of the dimensioning of the groove pattern imprinted. The height of said particles should not exceed a value of 5 μm, in particular 2 μm. Such a nanoparticle coating ensures that drops of water accumulating in those locations do not wet and penetrate into the sail membrane itself but roll off the surface and thus reduce the water absorption of the membrane.

Moreover, the invention relates in particular to a process for manufacturing a sail membrane in accordance with one of the claims described hereinbefore, with the fabric in the form of gray cloth or semi-finished product being dyed and/or finished as the case may be after production and then calendered on at least one side at a pressure of at least 50 N/mm using a corrugated roll for the embossing of a groove structure having a density ranging between 5 and 25 grooves/mm.

In the process according to the invention the calendering operation as a rule is to be the final manufacturing step yielding the finished sail membrane product. All dyeing and finishing steps are to be carried out beforehand which also applies to hydrophobization coatings that may be applied. In the event the sail membrane is a laminate or composite comprising several layers, first the laminate is to be made before calendering takes place. As an alternative, sheets calendered on one side may be used for a laminate, with said sheets to be laminated subsequently. Calendering takes place at elevated temperature with the corrugated roll being heated up to a temperature adjusted so as to be below the softening or melting point of that synthetic fiber that has the lowest melting point. Preferably, this temperature is approx. 10° C. below the melting or softening point. With a view to improving the embossing effect the fabric may be subjected to an initial water vapor treatment, e.g. using hot steam of 110° C. A hydrophobization step as described above is also performed before the calendering operation. Further refining measures, for example the application of nanoparticle coatings aimed at improving hydrophobic characteristics, take place after calendering.

A special case in this context is the production of membranes provided with microroughness with yarns placed between the sheets along predetermined load lines. Expediently, the sheets are calendered first in this case, that is on one side in the manner previously described herein. Also sheets may be used that already have an appropriate microroughness. Onto such a sheet the reinforcing yarns are then arranged along the predetermined load lines. After the covering sheet has been put in place the laminate is produced by exerting pressure, with the bonding effect being achieved by adhesive material applied or by fusion/melting methods. Lamination processes of this kind are known per se to persons skilled in the art.

Taking the inventive sail membrane sails can be manufactured in a customary manner. For this purpose the sail is assembled from individual webs or fabric segments, with the main load lines and the tearing resistance in the various directions being duly taken into account in a manner known per se. In the event the sail membrane consists of a laminate, said laminate may be provided with reinforcing yarns in a manner known per se.

Accordingly, the invention also relates to a sail manufactured from an inventive sail membrane, in particular sails generating propulsion as a result of the flow-induced differential pressure existing between the leeward and windward side of the sail.

It has been found that thanks to the groove structure provided sail membranes manufactured on the basis of the present invention cause less turbulence and thus have a lower resistance to air, especially when sailing close to the wind. At the same time the calendering operation results in a fabric's permeability to air being significantly reduced so that, as a rule, a coating or compacting step during which filler materials or adhesives are integrated can be dispensed with. Nevertheless, the air permeability low as it is already may still be reduced further and even brought down to zero by taking customary coating measures for which less coating material will be needed.

Creating a groove structure by means of calendering improves also the grip characteristics of the sail and thus makes handling easier. Normally, the tearing resistance of the sail membrane made in this way is not impaired.

If the inventive sail membrane is additionally provided with a nanoparticle layer aimed at improving the membrane's water repellency its water absorptiveness can be significantly reduced in this way. In this case a continuous coating with a water-repellent agent—as well as a coating intended to reduce the permeability to wind—can be dispensed with entirely or to a large extent so that altogether a considerable reduction in weight of both a dry sail and of a sail in use at a given time is achieved.

BRIEF DESCRIPTION OF THE DRAWINGS

The invention is explained in more detail by way of the enclosed figures where

FIG. 1 shows a sailcloth fabric after calendering, 60× magnified,

FIG. 2 shows a sailcloth fabric after calendering, 60× magnified, and

FIG. 3 is a section of FIG. 2, 300× magnified.

DETAILED DESCRIPTION OF THE INVENTION

In FIG. 1 a sailcloth is illustrated that consists of a woven polyamide fabric with its clearly visible warp and weft yarns extending perpendicularly to each other and being of plain weave design. By means of a calendering roll with X-corrugations an X-pattern of intersecting grooves is embossed into this fabric, said grooves running diagonally to the direction of the fabric. The individual grooves are spaced at approximately 125 μm corresponding to 8 grooves/mm. The sets of grooves running diagonally from top left to bottom right and from bottom left to top right intersect at an angle of approximately 90°. The embossing pressure was 300 N/mm, the roll temperature was adjusted to a value of 200° C.

FIG. 2 shows the 60× magnified representation of a sailcloth made of polyester fabric provided with embedded polyethylene reinforcing yarns, said fabric being provided with X-corrugations similar to those used on the material shown in FIG. 1. The embossing pressure was 400 N/mm, the roll was adjusted to a temperature of 140° C. The respective groove sets are arranged parallelly to each other and extend diagonally from top left to bottom right or from bottom left to top right thus forming the X-pattern. The intersection angle is 95° with said angle being open towards the left side of the figure (weft direction). The groove density amounts to 20 grooves/mm corresponding to a 50-μm spacing from groove to groove of a parallelly arranged groove set.

FIG. 3 shows a section of FIG. 2 which has been magnified 300×. Clearly visible are the crests of the intersecting grooves extending diagonally to the direction of the fibers and the enclosed diamond-shaped depressions made in the fiber surface, with said chain-like depressions continuing in fiber direction.

Examinations carried out on a raw polyamide woven fabric processed by means of a corrugated roll with 8 lines/mm at a temperature of 200° C. have shown that after calendering the permeability to air at 20 mm WC of 600 to 800 l/dm²/min was significantly reduced to 30 to 40 l/dm²/min for the gray cloth. Further reduction is to be expected for the dyed cloth. In case of the coated sailcloth the permeability to air goes down to zero, with the coating amount being considerably lower for the calendered cloth. A lower amount of coating enables the weight of the finished sail to be reduced and such a saving in weight can be utilized to apply reinforcing measures (reinforcing yarns).

With a view to achieving optimum results the treatment by means of the corrugated roll must always be performed on both sides.

For the purpose of determining the resistance to air sail membrane samples were tested in a wind tunnel using an MAV scales test piece (6-component strain gauge MAV scales) at a windspeed of 18 m/s. The MAV scales test piece was a trapezoidal wing of small extension having a symmetrical profile. The leading edge sweep was 36°, the rear edge was straight. The wing area was covered with the cloth patterns in such a manner that the covering embraced the top side of the wing completely while just abt. a quarter of the bottom side was covered.

For a non-corrugated sail membrane the measuring results showed a coefficient of drag value $C_{Wa}$ of $7.08 \times 10^{-3}$ on average, for a membrane with intersecting corrugations comprising 10 grooves/mm a value of $6.54 \times 10^{-3}$ and with 20 grooves/mm a value of $6.4 \times 10^{-3}$. These are mean values determined from 500 measurements on eight measuring points.

The sail membrane samples were made of a polyester/polyethylene mixed woven fabric.

The invention claimed is:

1. A method for manufacturing a sail membrane comprising the steps:
   providing a cloth comprising synthetic fibers,
   subjecting the cloth to a water vapor treatment at a temperature of up to 110° C.; and
   calendering the cloth at a pressure of at least 50 N/mm using a corrugated roll to emboss parallelly extending grooves into the cloth on at least one side.

2. The method according to claim 1, further comprising the step of laminating the cloth to one or more sheets prior to the calendering step.

3. The method according to claim 1, wherein the cloth is calendered on both sides.

4. The method according to claim 1, further comprising the step of hydrophobizing the cloth prior to calendering.

5. The method of claim 1, wherein the step of calendering the cloth comprises using a pressure of 100 to 600 N/mm.

6. The method of claim 1, further comprising the step of dyeing the cloth prior to the calendering step.

7. A method for manufacturing a sail membrane comprising the steps:
   providing a sheet,
   calendering the sheet on at least one side at a pressure of at least 50 N/mm using a corrugated roll to emboss parallelly extending grooves into the sheet,
   placing yarns on the calendered sheets, and
   laminating the sheets and yarns together.

8. The method according to claim 7, wherein the step of calendering further comprises heating the corrugated roll to a temperature below a softening point of the sail membrane material having the lowest melting point.

9. The method according to claim 8, wherein the roll temperature is about 10° C. lower than the softening point.

10. The method of claim 7, wherein the step of calendering the cloth comprises using a pressure of 100 to 600 N/mm.

* * * * *